(12) United States Patent
Carrion Vaughn et al.

(10) Patent No.: US 11,341,943 B2
(45) Date of Patent: May 24, 2022

(54) MUSICAL INSTRUMENT ARM SUPPORT

(71) Applicant: Wisconsin Alumni Research Foundation, Madison, WI (US)

(72) Inventors: Adrianna N. Carrion Vaughn, Madison, WI (US); Jonah Mudge, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 17/243,036

(22) Filed: Apr. 28, 2021

(65) Prior Publication Data

US 2021/0335329 A1    Oct. 28, 2021

Related U.S. Application Data

(60) Provisional application No. 63/016,447, filed on Apr. 28, 2020.

(51) Int. Cl.
*G10D 9/00* (2020.01)
*G10G 5/00* (2006.01)
*F16M 13/04* (2006.01)

(52) U.S. Cl.
CPC ............. *G10G 5/005* (2013.01); *F16M 13/04* (2013.01); *G10D 9/00* (2013.01)

(58) Field of Classification Search
CPC ........ G10G 5/005; F16M 13/04; F16M 11/14; F16M 11/2078; G10D 9/00
See application file for complete search history.

(56) References Cited

U.S. PATENT DOCUMENTS

| 5,215,239 | A | 6/1993 | Walters, Jr. | |
| 9,514,721 | B1 * | 12/2016 | Champion | G10G 5/005 |
| 9,659,551 | B1 * | 5/2017 | Rubin | G10G 5/005 |
| 9,737,374 | B2 | 8/2017 | Doyle | |

* cited by examiner

*Primary Examiner* — Kimberly R Lockett
(74) *Attorney, Agent, or Firm* — Boyle Fredrickson S.C.

(57) ABSTRACT

A musical instrument support system provides support to a musician's elbow when the musician's arm is in a raised position, thus alleviating fatigue and strain on the musician's shoulder, neck, back and arms. The support system includes a harness worn on the musician's torso, a rib plate supported by the harness that is worn along the musician's torso, an elbow support that receives the musician's elbow, and a swivel joint that joins the elbow support to the rib plate and permits the elbow plate to rotate and angulate about a vertical axis and move laterally from the rib plate in all directions within a horizontal plane.

18 Claims, 3 Drawing Sheets

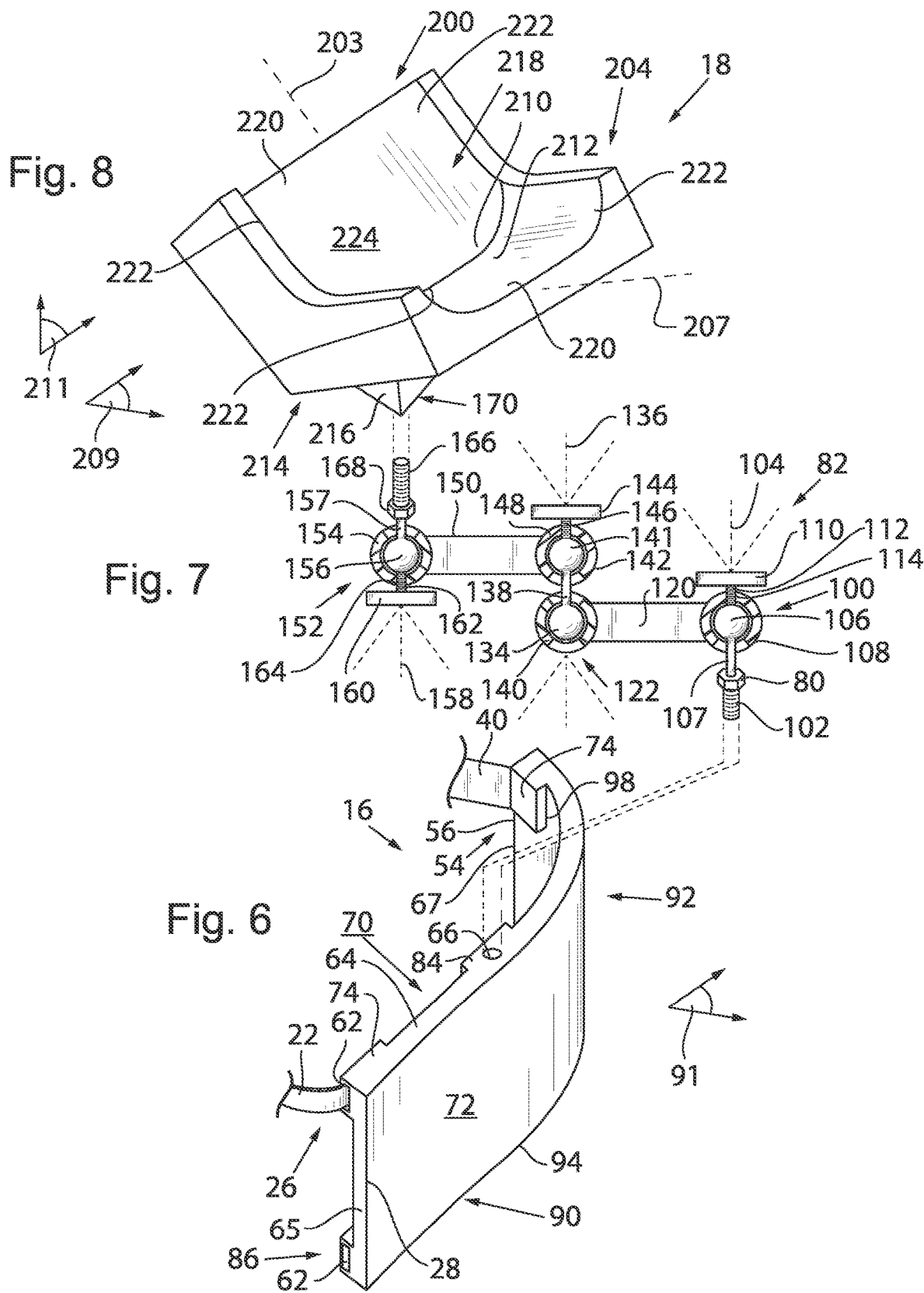

MUSICAL INSTRUMENT ARM SUPPORT

CROSS REFERENCE TO RELATED APPLICATION

This application claims the benefit of U.S. Provisional Patent Application No. 63/016,447, filed Apr. 28, 2020, which is incorporated by reference herein in its entirety.

BACKGROUND OF THE INVENTION

The present invention relates to an arm support for supporting an arm of a user during the playing of a musical instrument, and more particularly, a pivotable elbow support for keeping the elbow in a raised position when playing the musical instrument.

The flute is a woodwind instrument that requires the musician to blow through an open tube forming the flute. One class of flutes are side blown (or transverse) flutes that include a hole on the side of the tube that requires the musician to blow into the side of the tube to produce a tone. Thus, the side-blown flutes are held up by the musician's arms so that the musician's mouth is on the hole and the tube is held parallel to the floor or at a slight downward angle (e.g., 10 to 45 degrees) from parallel. Typically, the side-blown flute is held asymmetrically, and extends outward from the musician's right-hand side. The musician's left arm extends cross body to support the proximal end of the flute nearest the hole and the musician's right arm supports the distal end of the flute away from the hole. The flute is supported unilaterally in an elevated arm position against gravity for extended durations causing unique postural and musculoskeletal problems. Other musical instruments are similarly held at elevated or unilateral arm positions which may exhibit similar problems, e.g., violins, violas, trumpets, piccolos, and the like.

During extended periods of playing, strain is placed on the musician's body. Major studies have shown that flutists report playing-related pain in the neck, middle/upper back, shoulders, wrists, and hands. The most common ailments involve the neck and upper back regions.

Specifically, an elevated arm position requires sustained abduction and flexion (bending forward) of the left shoulder, sustained abduction (drawing away) of the right shoulder, and small movements and rotation of the head and neck to the left. As fatigue sets in, the shoulder tenses and raises toward the neck, causing tension or spasms which can trap the nerves of the shoulder and neck. Compression of these nerves can cause harm to the arm mimicking carpal tunnel, and contraction of the shoulder and neck muscles reducing blood flow and causing muscle pain. Medical injuries related to elevated arm position include nerve compression (thoracic outlet syndrome, pronator teres syndrome), muscle injury (lateral epicondylitis, shoulder, upper back, and neck pain from muscle strain, rotator cuff lesions, occupational cramp, focal dystonia), osteoarthritis, bursitis, joint instability and poor posture.

Although some efforts have been made to emphasize minimizing factors such as taking more frequent breaks, using more efficient posture, and improving ensemble seating, these ailments remain persistent at a high rate. Musicians with sustained or repetitive strain injuries may resort to instrument modifications such as a modified (curved) head joint, for example, sold by Drelinder Headjoint Company of North White Plains, N.Y. and Flutelab of Amsterdam, Netherlands, that allows the musician to play the flute without the instrument in an elevated arm position (instead the flute is held closer to vertical like a clarinet) but that compromise sound quality and overall performance.

SUMMARY OF THE INVENTION

The present invention provides a musical instrument support system for providing support to a musician's elbow when the musician's arm is in a raised position, thus alleviating fatigue and strain on the musician's shoulder, neck, back and arms. The support system includes a harness worn on the musician's torso, a rib plate supported by the harness that is worn along the musician's torso, an elbow support that receives the musician's elbow, and a swivel joint that joins the elbow support to the rib plate and permits the elbow plate to pivot and angulate about vertical axes and move laterally from the rib plate in all directions within a horizontal plane.

In one embodiment of the present invention, an arm support for supporting an arm of a musician user in a raised position with an elbow of the arm is bent and an upper arm and forearm of the arm raised upward from a relaxed downward position includes an elbow support for receiving the elbow when the elbow is bent and extending downwardly into the elbow support and the forearm is extending upward; a brace extending from a front end to a rear end and sized to abut and be supported against a side of the user's torso; a strap providing an upward support of the brace; and a pivoting connector communicating between the elbow support and the brace to lock a lateral and vertical position of the elbow support with respect to the brace.

It is thus one feature of at least one embodiment of the present invention to provide a stabilizing elbow support that can be locked in place by mounting the brace at a position on the body with reduced movement and generally grounded by the user's lower body.

The pivoting connector permits adjustment of the elbow support in both lateral and vertical directions with respect to the brace.

It is thus one feature of at least one embodiment of the present invention to permit a position of the elbow support to be adjustable to accommodate use with different instruments.

The brace may be rigid panel.

It is thus one feature of at least one embodiment of the present invention to prevent movement of the brace when a weight is placed on it in a downward direction by providing a broad surface area stabilized along the side of the body.

A first swivel joint may permit the elbow support to rotate about a first vertical axis of the swivel joint; and a second swivel joint may permit the elbow support to swing laterally about a second vertical axis, the second vertical axis parallel to the first vertical axis. At least one of the first and second swivel joint may include a ball and socket receiving a locking knob therein to prevent rotation and angulation of the ball.

It is thus one feature of at least one embodiment of the present invention to allow the user to self-adjust and lock a position of the elbow support with respect to the brace using simplified joints.

A third swivel joint may be positioned between the first and second swivel joint permitting the elbow support to rotate about a third vertical axis parallel to the first and second vertical axes and permitting the elbow support to swing laterally about the third vertical axis. The third swivel joint may include a ball and socket receiving a locking knob therein to prevent rotation and angulation of the ball.

It is thus one feature of at least one embodiment of the present invention to allow for free translation of the elbow support in three dimensions—in two directions in a vertical plane and two directions in a horizontal plane.

The elbow support may provide a first plate receiving the forearm and a second plate receiving the upper arm.

It is thus one feature of at least one embodiment of the present invention to cup the user's elbow and concentrate the downward forces of the arm to a small support area that does not interfere with playing the instrument but supported by the brace.

The first plate and second plate may be connected at an angle of at least 90 degrees. The first plate and second plate may be connected at an obtuse angle.

It is thus one feature of at least one embodiment of the present invention to accommodate a natural bend of the elbow during play of a musical instrument.

The elbow support may provide a curved concave bowl where the bowl of the elbow support may have a flat portion.

It is thus one feature of at least one embodiment of the present invention to increase a surface area of the lower support surface to distribute the forces on the elbow support.

The elbow support may provide upwardly extending sidewalls. The sidewalls may be curved concave rails extending along outer lateral edges of the elbow support.

It is thus one feature of at least one embodiment of the present invention to comfortably conform the support walls to the natural concave shape of the arm.

The brace is curved along a horizontal plane parallel to a ground. The brace may have a straight portion and a curved portion. The curve of the brace may have a radius of curvature of about 10.16 cm (4 inches) and about 10 cm (3.937 inches).

It is thus one feature of at least one embodiment of the present invention to assist the user in properly placing the brace along the natural curve of the side of the user's torso above the hip.

The strap may include a first end attached to the front end of the brace and a second end attached to the rear end of the brace. The harness may include a length adjuster permitting the brace to be adjusted vertically.

It is thus one feature of at least one embodiment of the present invention to distribute the weight of the supported arm to both sides of the body, namely, to distribute forces to both the left and right shoulders of the user.

One embodiment of the present invention provides a method of supporting an arm of a musician user in a raised position with an elbow of the arm is bent and raised above a vertical position of the elbow when the arm is in a relaxed position at a side of the user's torso, the method including providing an arm support having an elbow support for receiving the elbow when the elbow is bent and extending downwardly into the elbow support and the forearm is extending upward; a brace sized to abut and be supported against a side of the user's torso; a strap providing an upward support of the brace; and a pivoting connector communicating between the elbow support and the brace to lock a lateral and vertical position of the elbow support with respect to the brace. The method further includes extending the strap over a shoulder of the user; placing the brace against the side of the user's torso; and putting the elbow of the arm into the elbow support.

It is thus one feature of at least one embodiment of the present invention to position elbow support at lateral sides of the user's body where the user's arms are typically positioned during the playing of musical instruments.

These particular objects and advantages may apply to only some embodiments falling within the claims and thus do not define the scope of the invention.

BRIEF DESCRIPTION OF THE DRAWINGS

FIG. 6 is a perspective view of a rib plate of the musical instrument support system of FIG. 1 connected to the pivot support and conforming to the user's side of the body;

FIG. 7 is a partial cross-sectional view of the pivot support of the musical instrument support system of FIG. 1 connected to the rib plate and having ball joints providing pivoting rotation and angulation of the elbow support about vertical axes, and translation of the elbow support within a horizontal plate; and FIG. 8 is a perspective view of an elbow support of the musical instrument support system of FIG. 1 having a forearm plate connected to an upper arm plate at an angle.

DETAILED DESCRIPTION OF THE PREFERRED EMBODIMENT

Figure 1:
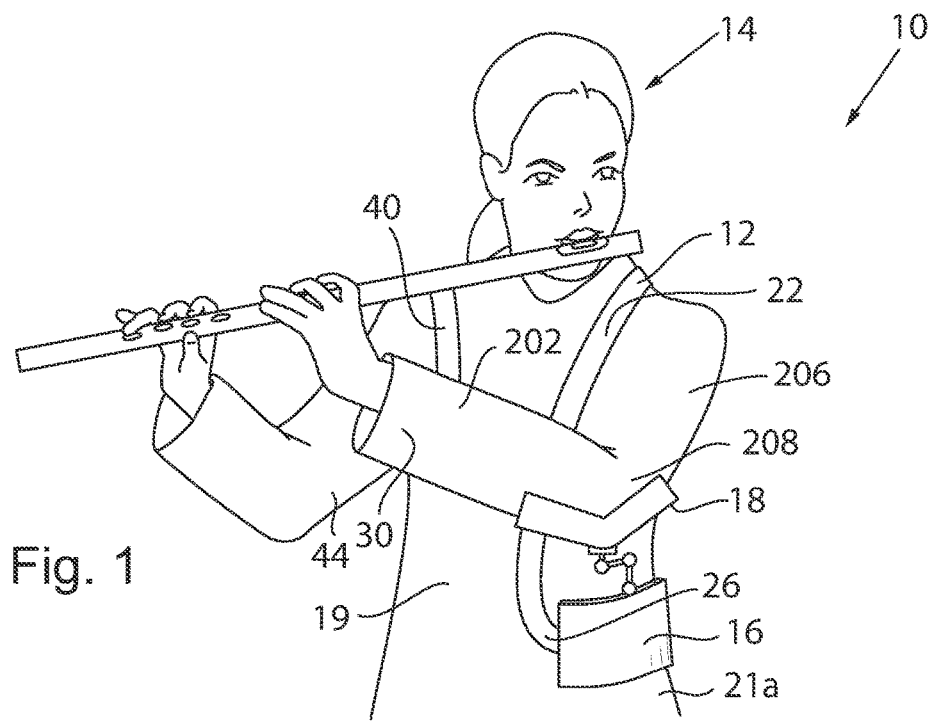
FIG. 1 is a perspective view of a first embodiment of the musical instrument support system of the present invention worn by a human user and supporting a left elbow of the user in a raised position.

Referring to FIG. 1, a musical instrument support system 10 may include a harness 12 worn on an average human user 14 and further supporting a rib plate 16 holding vertically upward an elbow support 18 in articulating fashion from the rib plate 16.

Figures 2, 3:
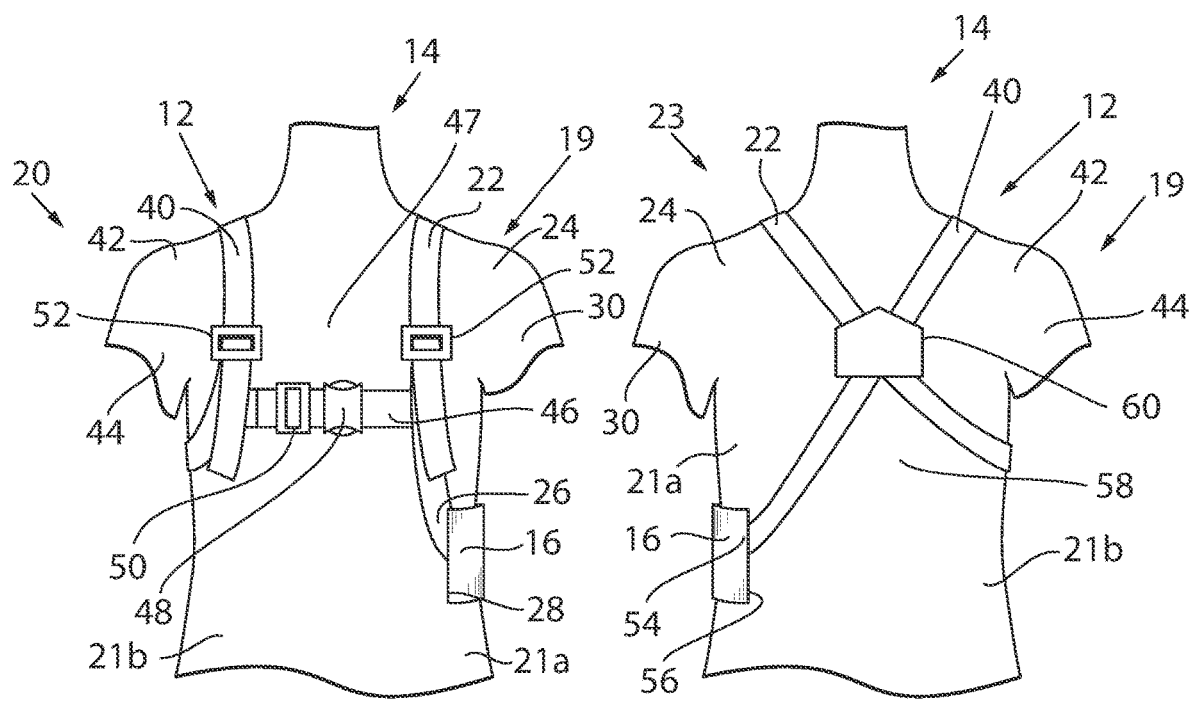
FIG. 2 is a schematic representation of a front elevation view of the user's torso, and a harness of the musical instrument support system of FIG. 1 being worn on the user's torso.
FIG. 3 is a schematic representation of a rear elevation view of the user's torso, and a harness of the musical instrument support system of FIG. 1 being worn on the user's torso.

Referring also to FIGS. 2 and 3, the harness 12 of the support system 10 fits around a torso 19 of the user 14. The harness 12 may generally include a front strap portion 20 as shown in FIG. 2 and a rear strap portion 23 as shown in FIG. 3 that operate together to restrain the rib plate 16 tightly along a side 21 of the torso 19 of the user 14 above the hip.

The front strap portion 20 may include a flexible left arm strap 22 extending generally vertical from over a left shoulder 24 of the user 14 to a first attachment point 26 at an upper, front end 28 of the rib plate 16, below the left arm 30. The left arm strap 22 may be attached to the first attachment point 26 by means of an adhesive such as glue or bonding methods such as solvent welding. The left arm strap 22 may alternatively include a loop that may be looped around a slot opening of the first attachment point 26. The attachment point 26 may alternatively utilize inter-engaging hook and loop fasteners that are more resistant to shear forces (and thus help stabilize the position of the rib plate 16 along the torso) but readily disconnect under normal force by the user, for example, if the user 14 needs to rapidly remove the left arm strap 22 from the rib plate 16.

The front portion 20 may further include a flexible right arm strap 40 extending generally vertical from over a right shoulder 42 of the human user 14 to a position underneath the human user's right arm 44.

The left arm strap 22 may be connected to the right arm strap 40 by a flexible sternum strap 46 extending laterally between the left arm strap 22 and right arm strap 40 across a chest 47 of the user 14. The sternum strap 46 may be attached to the left arm strap 22 and right arm strap 40, respectively, approximately at a midpoint between a top of the left shoulder 24 of the user 14 and the attachment point 26. The sternum strap 46 may be attached to the left arm strap 22 and right arm strap 40 via clasps or loops at the ends of the sternum straps 46 or joined by stitching, however, other attachment methods are contemplated. The sternum strap 46 may assist to disperse the weight on the harness 12 off the user's shoulders 24, 42 and to prevent the left arm strap 22 and right arm strap 40 from sliding off the user's shoulders 24, 42.

The sternum strap 46 may include a buckle 48, for example, a side squeeze buckle commonly used with backpacks or on a belt, that may be used to clasp the left arm strap 22 and right arm strap 40 together to secure the harness 12 on the user 14 or to separate the left arm strap 22 and right arm strap 40 to assist with placing the harness 12 on the user 14. The sternum strap 46 may include a length adjuster 50 that may be used to adjust a length of the sternum strap 46 so that the harness 12 fits comfortably but snugly on the torso 19 of the user 14.

The left arm strap 22 and right arm strap 40 may include length adjusters 52 that may be used to shorten or lengthen the length of the left arm strap 22 and right arm strap 40 so that the harness 12 fits comfortably but snugly on the torso 19 of the user 14. In particular, the left arm strap 22 may also be adjusted to raise and lower the rib plate 16 positioned on a left side 21a of the torso 19 of the user 14 to a desired height generally above the hip.

The rear strap portion 23 may include the left arm strap 22 extending generally obliquely from over the left shoulder 24 of the user 14 to a position underneath the human user's right arm 44, therefore, joining with the front portion 20.

The rear portion 23 may also include the right arm strap 40 extending generally obliquely from over the right shoulder 42 of the user 14 to a second attachment point 54 at an upper, rear end 56 of the rib plate 16, therefore, joining with the front portion 20. Similar to the first attachment point 26, the right arm strap 40 may be attached to the second attachment point 54 by means of an adhesive such as glue or bonding methods such as solvent welding. The right arm strap 40 may alternatively include a loop that may be looped around a slot opening of the first attachment point 54. The attachment point 54 may alternatively utilize inter-engaging hook and loop fasteners that are more resistant to shear forces (and thus help stabilize the position of the rib plate 16 along the torso) but readily disconnect under normal force by the user, for example, if the user 14 needs to rapidly remove the right arm strap 40 from the rib plate 16.

The left arm strap 22 and right arm strap 40 may intersect toward a middle of a back 58 of the user 14 where an intersection of the left arm strap 22 and right arm strap 40 may be secured by a buckle 60 that holds the left arm strap 22 and right arm strap 40 in interlocking or intersecting positions.

The front strap portion 20 and the rear strap portion 22 of the harness 12 work together to hold the rib plate 16 upward along the side 21 of the of the torso 19 of the user 14 above the hip in a fixed position abutting the side 21 of the torso 19 without allowing the rib plate 16 to move away from the side 21 of the torso 19 or to slide downward along the side 21 of the torso 19.

The straps of the harness 12 may be flat strips of a durable, flexible, heavy-duty material, such as nylon, canvas, polyester webbing, or polypropylene webbing. The flat strips may have a width of approximately 2 to 3 cm (0.787 to 1.181 inches) and about 2.5 cm (0.984 inches).

Figures 4, 5:
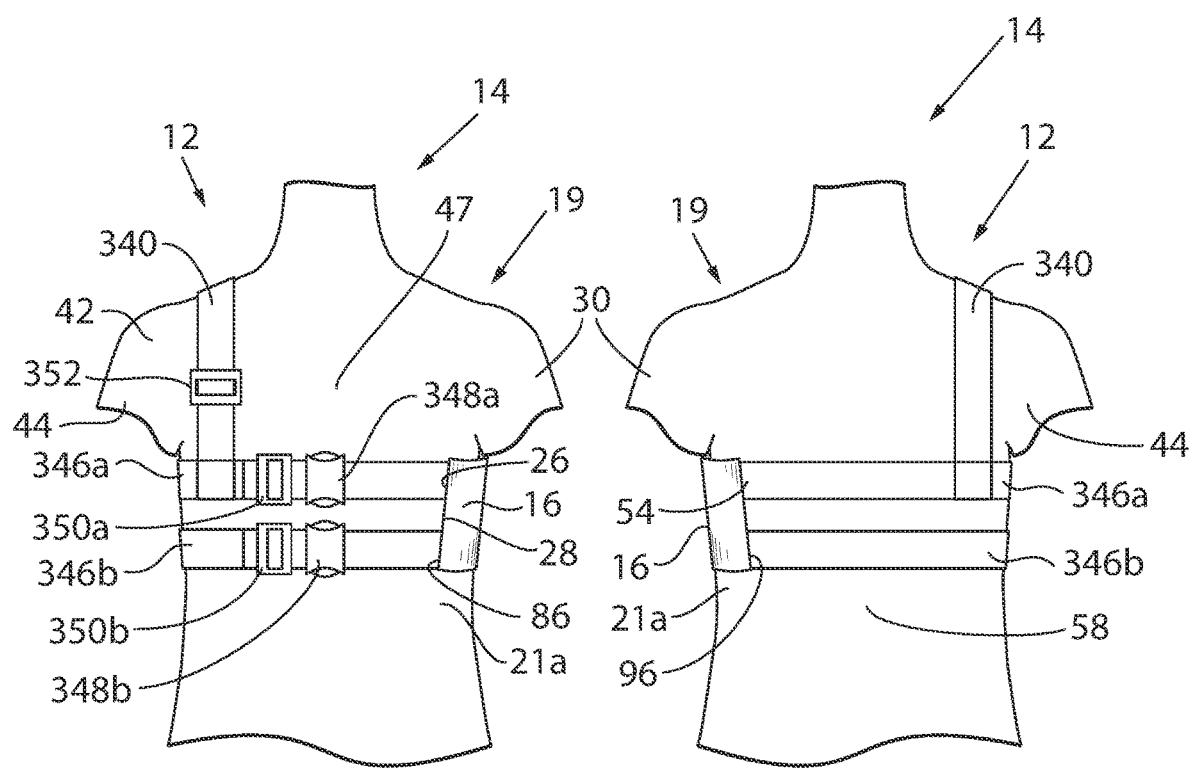
FIG. 4 is a schematic representation of a front elevation view of the user's torso, and an alternative embodiment of a harness of the musical instrument support system being worn on the user's torso.
FIG. 5 is a schematic representation of a rear elevation view of the user's torso, and the alternative embodiment of the harness of FIG. 4 being worn on the user's torso.

Referring to FIGS. 4 and 5, in an alternative embodiment of the present invention, the harness 12 of the support system 10 fits around the torso 19 of the user 14, similar to the harness 12 shown in FIGS. 2 and 3, but consisting of a flexible right arm strap 340 extending generally vertical over a right shoulder 42 of the human user 14 downward to a laterally extending upper flexible sternum strap 346a extending around the torso 19 of the user 14. The lower ends of the right arm strap 240 are attached to the upper flexible sternum strap 346a at both front and rear sides of the torso 19, respectively, of the user 14. The right arm strap 340 may be attached to the upper flexible sternum strap 346a via clasps or loops at the lower ends of the right arm strap 340 or joined by stitching, however, other attachment methods are contemplated. The flexible right arm strap 340 may include a length adjuster 352 that may be used to shorten or lengthen a length of the flexible right arm strap 340 to raise or lower the rib plate 16 positioned on the left side 21a of the torso 19 of the user 14 to a desired height generally above the hip.

The upper sternum strap 346a may extend laterally across the chest 47 of the user 14 and circumferentially around the torso 19 of the user 14 to extend laterally across the back 58 of the user 14, and a lower sternum strap 346b may extend laterally across the chest 47 of the user 14 and circumferentially around the torso 19 of the user 14 to extend laterally across the back 58 of the user 14, below the upper sternum strap 146a. The upper sternum strap 246a and lower sternum strap 346b may includes length adjusters 350a, 350b used to adjust a circumference of the sternum strap 46 so that the harness 12 fits comfortably but snugly around the torso 19 of the user 14.

As seen in the front elevation view of FIG. 4, the upper sternum strap 346a is attached to the first attachment point 26 at an upper end of the front end 28 of the rib plate 16, below the left arm 30 and, as seen in the rear elevation view of FIG. 5, the upper sternum strap 346a is attached to the second attachment point 54 at an upper end of the rear end 56 of the rib plate 16.

As seen in the front elevation view of FIG. 4, the lower sternum strap 346b is attached to a third attachment point 86 at a lower end of the front end 28 of the rib plate 16, below the left arm 30 and, as seen in the rear elevation view of FIG. 5, is attached to a fourth attachment point 96 at a lower end of the rear end 56 of the rib plate 16.

The pair of flexible sternum straps 346a, 346b may include a pair of buckles 348a, 348b, respectively, for example, side squeeze buckles commonly used with backpacks or on a belt, that may be used to clasp a left side and a right side of the sternum straps 346a, 346b, respectively, together to secure the harness 12 on the user 14 or to separate the sternum straps 346a, 346b to assist with placing the harness 12 on the user 14.

It is understood that use of four attachment points 26, 54, 86, 96 to the rib plate 16 may provide increased stability of the rib plate 16 along the side 21 of the user's torso 19.

Referring to FIG. 6, the rib plate 16 of the support system 10 may be a curved, rigid panel with a broad surface area supporting the first attachment point 26 and the second attachment point 54 of the left arm strap 22 and right arm strap 40, respectively. An upper end of the front end 28 of the rib plate 16 may support the first attachment point 26 and an upper end of the rear end 56 of the rib plate 16 may support the second attachment point 54.

The attachment points 26, 54 may comprise of channels 62 extending through a front edge 65 and rear edge 67 of the rib plate 16 and sized to receive therein distal ends of the left arm strap 22 and right arm strap 40 respectively. The channels 62 permit the ends of the left arm strap 22 and right arm strap 40 respectively to be adhered or otherwise fastened within the channels 62. The channels 62 may be reinforced on an inner surface 70, and optionally an outer surface 72, of the rib plate 16 by a reinforcement wall 74 of the channels 62 extending along and parallel to the inner and/or outer surfaces 70, 72 of the rib plate 16. In this respect, the rib plate 16 may have an increased thickness surrounding the channels 62 providing increased strength around the channels 62. The attachment points 26, 54 may alternatively take the form of slot openings receiving a loop of the left arm strap 22 and right arm strap 40. The attachment points 26, 54 may alternatively take the form of inter-engaging hook and loop fasteners.

Although the rip plate 16 is described with respect to use with the harness 12 shown and described in FIGS. 2 and 3 and two attachment points 26, 54 of the rib plate 16, it is understood that the rib plate 16 may also be used with respect to the alternative embodiment of the harness 12 shown and described in FIGS. 4 and 5 and four attachment points 26, 54, 86, 96 of the rib plate 16 in a similar manner.

A top edge 64 of the rib plate 16, toward a midpoint between the front edge 65 and the rear edge 67, may include a fastener hole 66 receiving a fastener 80 therein of a joint assembly 82 to be further described below. The fastener hole 66 may be reinforced on an inner surface 70, and optionally an outer surface 72, of the rib plate 16 by a reinforcement wall 84 of the hole 66 extending along and parallel to the inner and/or outer surfaces 70, 72 of the rib plate 16. In this respect, the rib plate 16 may have an increased thickness surrounding the hole 66 providing increased strength around the hole 66.

The rib plate 16 may generally have a front portion 90 that is generally straight when viewed from above and along a horizontal plane 91, substantially parallel to a ground, and a rear portion 92 that is generally curved when viewed from above and along the horizontal plane 91 to generally conform with the side 21 of the torso 19 above the user's hip. The rib plate 16 is generally worn with the front portion 90 abutting an anterior side of the torso 19 and the rear portion 92 abutting a posterior side of the torso 19 with the curve of the rib plate 16 conforming to the natural curves of the side 21 of the torso 19. The rear portion 92 may be a curve that has a radius of curvature of between 7.62 to 10.16 cm (3 to 4 inches) and between 8.89 to 10.16 cm (3.5 to 4 inches) and approximately 10.16 cm (4 inches) and approximately 10 cm (3.937 inches) and an arc length of between 12.7 to 15.24 cm (5 to 6 inches) and between 12.7 to 13.97 cm (5 to 5.5 inches) and approximately 12.7 cm (5 inches) and approximately 13.3 cm (5.238 inches).

The rib plate 16 may generally have a broad surface area with a length extending between the front edge 65 to the opposed rear edge 67 of approximately 20 to 30 cm (7.874 to 11.811 inches) and approximately 20 to 25 cm (7.874 to 9.843 inches) and about 22.8 cm (8.976 inches), and a height extending between the top edge 64 to the opposed bottom edge 94 of approximately 10 to 20 cm (3.937 to 7.874 inches) and approximately 10 to 15 cm (3.937 to 5.906 inches) and about 12.7 cm (5 inches). The length of the front portion 90 may be shorter than the length of the front portion 90. The length of the front portion 90 may be approximately 7.5 to 10 cm (2.952 to 3.937 inches) and the length of the rear portion 92 may be approximately 10 to 15 cm (3.937 to 5.906 inches). The thickness of the rib plate 16 between the inner and outer surfaces 70, 72 may be approximately 0.5 to 1 cm (0.197 to 0.394 inches) and about 0.7 cm (0.276 inches), with the thickness of the rib plate being approximately 1 to 1.5 cm (0.394 to 0.591 inches) and about 1.2 cm (0.472 inches) at the increased thickness surrounding the hole 66 and channels 62.

The rib plate 16 may be constructed of a lightweight, thermoplastic or plastic polymer material such as PLA (polylactic acid), ABS (acrylonitrile butadiene styrene), PETG (polyethylene terephthalate) or another durable plastic that may be, optionally, 3D printed for convenience.

The inner surface 70 of the rib plate 16 may include a pad 98 of cushion material such as polyurethane foam, foam rubber, and the like that conforms in size to the dimensions of the inner surface 70 and has a thickness of at least 0.5 cm (0.197 inches) and at least 1 cm (0.394 inches), and which may provide additional comfort when the hard rib plate 16 is worn along the human user's body.

It is understood that the rib plate 16 may include the corresponding third and fourth attachment points 86, 96, corresponding with the first and second attachment points 26, 54, on a lower end of the front end 28 and a lower end of the rear end 56 of the rib plate 16, respectively, to be used with respect with the alternative embodiment of the harness 12 shown and described in FIGS. 4 and 5, and/or may have a corresponding fastener hole (not shown), corresponding with the fastener hole 66, on the bottom edge 94 of the rib plate 16 such that the rib plate 16 may be optionally inverted about a horizontal axis such that the rib plate 16 may be worn on the right hand side of the body. In this respect, the same rib plate 16 may be worn in mirror image fashion on an opposite side of the body. In this alternative embodiment, the harness 12 may also be worn in mirror image fashion such that the rib plate 16 may be secured to the right-hand side of the human user's body. It is also understood that the harness 12 may also be constructed to support two rib plates 16 on both left- and right-hand sides of the human user's body.

Referring to FIG. 7, the fastener hole 66 will receive a fastener 80 of a joint assembly 82 of the support system 10. The joint assembly 82 includes a plurality of swivel joints and swivel arms that assist with the multi-directional extension and articulation of the elbow support 18 with respect to the rib plate 16.

A first swivel joint 100 may include a fastener 80 with a threaded shaft 102 received by the threaded fastener hole 66 of the rib plate 16, the threaded shaft 102 extending generally downward along a radial axis 104. The threaded shaft 102 is attached to a ball joint 106 received within a socket 108 having a spherical cavity receiving the ball joint 106 therein and allowing the ball joint 106 to rotate a rod 107 connecting the ball joint 106 and the fastener 80 about the radial axis 104 and angulate at approximately 45 degree angles with respect to the radial axis 104. A locking knob 110 may include a threaded shaft 112 screw attached into a corresponding threaded hole 114 of the socket 108, the threaded hole 114 extending generally along the radial axis 104. A distal tip of the threaded shaft 112, when the locking knob 110 is tightened, may be friction pressed onto the ball joint 106 to prevent the ball joint 106 from rotating about the radial axis 104 or angling about the radial axis 104 within the socket 108.

The socket 108 may be attached to a swivel arm 120 extending outwardly from an exterior of the socket 108 and spacing the socket 108 from a second swivel joint 122. The swivel arm 120 may be approximately 5 to 10 cm (1.969 to 3.937 inches) and about 7 cm (2.756 inches) in length.

The second swivel joint 122 may include a second socket 140 attached, on an exterior of the second socket 140, to the swivel arm 120. The second socket 140 may include a spherical cavity receiving a second ball joint 134 therein and allowing a connecting rod 138 to rotate about a second radial axis 136 and angulate at approximately 45 degrees angles about the radial axis 136. The connecting rod 138 may connect the second ball joint 134 to a third ball joint 141.

The third ball joint 141 may be received within a third socket 142 having a spherical cavity receiving the third ball joint 141 therein and allowing the connecting rod 138 to rotate about the second radial axis 136 and angulate at approximately 45-degree angles with respect to the radial axis 136. Thus, the connecting rod 138 may join the second socket 140 and third socket 142 to permit the second ball joint 134 and third ball joint 141 to rotate about the second radial axis 136 and to angulate about the second radial axis 136 with respect to the other.

A second locking knob 144 may include a threaded shaft 146 screw attached into a corresponding threaded hole 148 of the third socket 142, the threaded hole 148 extending generally along the second radial axis 136. A distal tip of the threaded shaft 146, when the second locking knob 144 is tightened, may be friction pressed into the second and third ball joints 134, 141 to prevent the second and third ball joints 134, 141 from rotating about the second radial axis 136 or angling about the second radial axis 136 within the second and third sockets 140, 142.

The third socket 142 may be attached to a second swivel arm 150 extending outwardly from an exterior of the third socket 142 and spacing the third socket 142 from a third swivel joint 152. The second swivel arm 150 may be approximately 5 to 10 cm (1.969 to 3.937 inches) and about 7 cm (2.756 inches) in length.

The third swivel joint 152 may include a fourth socket 154 attached, on an exterior of the fourth socket 154, to the second swivel arm 150. The fourth socket 154 may include a spherical cavity receiving a fourth ball joint 156 therein and allowing the fourth ball joint 156 to rotate a rod 157 connecting the fourth ball joint 156 and a fastener 168 about a third radial axis 158 and at approximately 45 degree angles with respect to the third radial axis 158. A locking knob 160 may include a threaded shaft 162 screw attached into a corresponding threaded hole 164 of the fourth socket 154, the threaded hole 164 extending generally along the third radial axis 158. A distal tip of the threaded shaft 162, when the locking knob 160 is tightened, may be friction pressed onto the fourth ball joint 156 to prevent the fourth ball joint 156 from rotating about the third radial axis 158 or angling about the third radial axis 158 within the fourth socket 154.

The fourth ball joint 156 may be attached to a threaded shaft 166 of the fastener 168, the threaded shaft 102 extending generally upward along the third radial axis 158. The fastener 168 may be received into a fastener hole 170 of the elbow support 18.

Referring to FIG. 8, the elbow support 18 of the support system 10 may include a forearm plate 200 supporting a portion of the forearm 202 of the user 14 along a forearm axis 203 and an upper arm plate 204 supporting a portion of the upper arm 206 of the user 14 along an upper arm axis 207 when an elbow 208 of the user 14 is bent at an angle and the forearm 202 is extended upward.

A lower surface 214 of the elbow support 18, proximate the joint between the forearm plate 200 and upper arm plate 204 includes a fastener coupling 216 holding a threaded fastener hole 170 extending along the third radial axis 158 and receiving the fastener 168 of the joint assembly 82. The fastener coupling 216 may be a rectangular or circular post extending downwardly from the lower surface 214 of the elbow support 18 and supporting the fastener hole 170. The fastener coupling 216 may have a width or diameter of approximately 2 to 3 cm (0.787 to 1.181 inches) and about 2.5 cm (0.984 inches).

A lower edge 210 of the forearm plate 200 may be joined to a lower edge 212 of the upper arm plate 204, for example, by a continuous weld or machine screw or the like. The forearm plate 200 and the upper arm plate 204 may be joined at lower ends 210, 212 to form an angle that is at least 90 degrees and approximately 90-110 degrees and approximately 100-110 degrees that comfortably receives a bent elbow 208 of the user 14 at a comfortable angle. The forearm plate 200 and upper arm plate 204 may be cupped to receive the downwardly extending elbow 208.

An upper surface 218 of the elbow support 18 generally provides a concave contact surface with a flat center portion 220 and curved outer lateral edges 222 which conform to the convex shape of the forearm 202 and upper arm 206. The flat center portion 220 of the forearm plate 200 may be approximately 8 cm (3.150 inches) long by 6 cm (2.362 inches) wide and the flat center portion 220 of the upper arm plate 204 may be approximately 8 cm (3.150 inches) long by 8 cm (3.150 inches) wide. The upper surface 218 may be sized to contact the lower convex surface of the human user's arm.

The outer lateral edges 222 of the forearm plate 200 and the upper arm plate 204, respectively, provide curved concave rails extending upwardly from the flat center portion 220 of the forearm plate 200 and the upper arm plate 204, respectively, along opposed edges of the longer dimension of the elbow support 18 (length) extending along the forearm axis 203 and upper arm axis 207. The outer lateral edges 222 generally cradle the forearm 202 and upper arm 206 situated in the elbow support 18.

The upper surface 218 of the elbow support 18 may include a pad 224 of cushion material such as polyurethane foam, foam rubber, and the like that conforms in size to the dimensions of the upper surface 218 and has a thickness of at least 0.5 cm (0.197 inches) and at least 1 cm (0.394 inches), and which may provide additional comfort to the user's forearm 202 and upper arm 206 when placed within the elbow support 18.

A length of the forearm plate 200 extending along the forearm axis 203 may be longer than a length of the upper arm plate 204 extending along the upper arm axis 207. For example, the length of the forearm plate 200 may be approximately 7 to 9 cm (2.756 to 3.543 inches) and at least 7 cm (2.756 inches) and about 8 cm (3.150 inches) and the length of the upper arm plate 204 may be approximately 5 to 7 cm (1.969 to 2.756 inches) and at least 5 cm (1.969 inches) and about 6 cm (2.362 inches). The forearm plate 200 may have a length that is approximately 15-25% of the length of the average human forearm (measured from elbow to fingertips). The upper arm plate 204 may have a length that is approximately 15-25% of the length of the average human upper arm (measured from elbow to shoulder). A width of the forearm plate 300 and upper arm plate 204 measured perpendicular to the forearm axis 203 and upper arm axis 207 may be approximately 11 to 13 cm (4.331 to 5.118 inches) and at least 11 cm (4.331 inches) and about 12 cm (4.724 inches).

It will be appreciated that through the swiveling of the swivel joints 100, 122, 152 of the joint assembly 82 between the swivel arms 120, 150, the elbow support 18 may be moved in two directions within a generally horizontal plane 209 (perpendicular to the generally vertical axes 104, 136, 158) and to a desired position within the horizontal plane 209 that may then be locked in place. The rotation and angulation of the swivel joints 100, 122, 152 may adjust the rotational position, and horizontal and vertical positions, of the elbow support 18 to a desired position within horizontal plane 209 and vertical plane 211 that may then be locked in place. The swivel joints 100, 122, 152 and swivel arms 120, 150 therefore provide translation in three dimensions so that it aligns with the position and angle of the user's arm and then locked in place.

The adjustment of the position of the rib plate 16 upward and downward, and side-to-side, along the side 21 of the torso 19 of the user 14 by shortening and lengthening the straps of the harness 12 may further adjust the vertical and horizontal positions of the elbow support 18 within the generally horizontal plane 209 (perpendicular to the generally vertical axes 104, 136, 158) and along the generally vertical plane 211 (parallel to the generally vertical axes 104, 136, 158), therefore providing translation in three dimensions so that it aligns with the position and angle of the user's arm and prevents downward movement of the elbow.

Referring to FIGS. 1 through 3, in operation, the harness 12 may be placed on the torso 19 of the user 14 by placing the left arm strap 22 around the left shoulder 24 and the right arm strap 40 around the right shoulder 42. At the front side of the torso 19, the sternum strap 46 is buckled across the user's chest 47 so that the left arm strap 22 and the right arm strap 40 are coupled across a front side of the torso 19. The length adjuster 50 of the sternum strap 46 may also be adjusted to tighten the harness 12 against the user's torso.

As shown, the rib plate 16 attached to the harness 12 is positioned on the left side 21a of the torso 19. The length adjusters 52 of the left arm strap 22 and right arm strap 40, may be adjusted so that the rib plate 16 is positioned at a desired height on the left side 21a of the torso 19, for example, above the user's hip.

Alternatively, referring to FIGS. 4 and 5, the alternative embodiment of the harness 12 may be placed on the torso 19 of the user 14 in a similar manner by placing the right arm strap 340 over the right shoulder 42 and the upper sternum strap 346a and lower sternum strap 346b below the right arm 44. At the front side of the torso 19, the upper sternum strap 346a and lower sternum strap 346b are buckled across the user's chest 47 so that the harness 12 is secured on the torso 19. The length adjusters 250a, 350b of the upper sternum strap 346a and lower sternum strap 346b, respectively, may be adjusted to tighten the harness 12 around the user's torso 19.

As shown, the rib plate 16 attached to the harness 12 is positioned on the left side 21a of the torso 19. The length adjuster 352 of the right arm strap 340 may be adjusted so that the rib plate 16 is positioned at a desired height on the left side 21a of the torso 19, for example, above the user's hip.

It is understood that the rib plate 16 may be similarly worn on the opposite right side 21b of the torso 19 in mirrored fashion by moving the rib plate 16 to the opposite side of the harness 12, or the harness 12 may support two rib plates 16 so that the rib plate 16 is positioned on both sides of the torso 19.

Referring also to FIGS. 6 and 7, the joint assembly 82 and elbow support 18 may be pre-attached to the rib plate 16 or the joint assembly 82 and elbow support 18 may be attached to the rib plate 16 after installation of the harness 12 on the user 14. The joint assembly 82 is attached to the rib plate 16 by attaching the fastener 80 to the threaded fastener hole 66 of the rib plate 16 by screwing the fastener 80 into the hole 66.

Referring also to FIG. 8, the elbow support 18 is attached to the joint assembly 82 by attaching the fastener 168 to the threaded fastener hole 170 of the elbow support 18 by screwing the fastener 168 into the hole 170.

A position of the elbow support 18 may be adjusted by pivoting the swivel joints 100 122, 152 and swiveling the swivel arms 120, 150 to move the elbow support 18 to a desired position. The desired position may be locked in place by finger twisting or rotating the locking knobs 110, 144, 160 to tighten the threaded shafts against the ball of the swivel joints 100, 122, 152, respectively, to prevent further rotation of the swivel joints 100, 122, 152.

The desired position of the elbow support 18 may depend on the arm position of the user 14 when supporting a musical instrument but generally positions the elbow 208 above hip level and at a side of the torso 19.

For example, when supporting a flute in a playing position, the user 14 extends their left arm across the front side 21 of the torso 19 with their left elbow positioned at a left side 21a of the body, elevated slightly below chest level but above hip level. Therefore, the elbow support 18 may be positioned proximate a left side 21a of the body at a front left side of the torso 19, slightly below chest level but above hip level. Likewise, when supporting the flute during playing, the user 14 extends their right arm outward at a right side 21b of the torso 19 with the right elbow 208 extending outward and elevated slightly below chest level but above hip level. Therefore, the elbow support 18 may be positioned proximate a right side 21b of the torso 19, slightly below chest level but above hip level.

It is understood that the playing position of other musical instruments may also require the user 14 to raise their arm or arms, and therefore, the elbow support 18 of the support system 10 may be used to assist with support of the elbow 208 above a natural, relaxed position of the arm at the user's side 21. In this respect, the support system 10 may be used to support an elbow of a user 14 in a raised position when playing, for example, violins, violas, trumpets, piccolos, and the like.

It is understood that the harness 12 of the support system 10 may support either or both the right or left elbows 208 of the user 14. The harness 12 may support both the right and left elbows simultaneously if the harness 12 includes two elbow supports 18 or if the user 14 wears two harnesses 12, each with one elbow support 18.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An arm support for supporting an arm of a musician user in a raised position with an elbow of the arm is bent and an upper arm and forearm of the arm raised upward from a relaxed downward position, the arm support comprising:
   an elbow support for receiving the elbow when the elbow is bent and extending downwardly into the elbow support and the forearm is extending upward;
   a brace extending from a front end to a rear end and sized to abut and be supported against a side of the user's torso;
   a strap providing an upward support of the brace; and
   a pivoting connector communicating between the elbow support and the brace to lock a lateral and vertical position of the elbow support with respect to the brace.

2. The arm support of claim 1 wherein the pivoting connector permits adjustment of the elbow support in both lateral and vertical directions with respect to the brace.

3. The arm support of claim 1 wherein the brace is a rigid panel.

4. The arm support of claim 1 wherein the pivoting connector comprises:
   a first swivel joint permitting the elbow support to rotate about a first vertical axis of the swivel joint; and
   a second swivel joint permitting the elbow support to swing laterally about a second vertical axis, the second vertical axis parallel to the first vertical axis.

5. The arm support of claim 4 wherein at least one of the first and second swivel joint comprises a ball and socket permitting angulation about the at least one of the first and second swivel joint and receiving a locking knob therein to prevent rotation and angulation of the ball.

6. The arm support of claim 4 further comprising a third swivel joint positioned between the first and second swivel joint permitting the elbow support to rotate about a third vertical axis, the third vertical axis parallel to the first and second vertical axes, and permitting the elbow support to swing laterally about the third vertical axis.

7. The arm support of claim 6 wherein the third swivel joint comprises a ball and socket permitting angulation about the third swivel joint and receiving a locking knob therein to prevent rotation and angulation of the ball.

8. The arm support of claim 1 wherein the elbow support provides a first plate receiving the forearm and a second plate receiving the upper arm, the first plate and second plate connected at lower respective ends.

9. The arm support of claim 8 wherein the first plate and second plate are connected at an angle of at least 90 degrees.

10. The arm support of claim 9 wherein the first plate and second plate are connected at an angle between 100-110 degrees.

11. The arm support of claim 1 wherein the elbow support provides upwardly extending sidewalls.

12. The arm support of claim 11 wherein the sidewalls are curved concave rails extending along outer lateral edges of the elbow support.

13. The arm support of claim 1 wherein the elbow support provides a curved concave bowl wherein the bowl has a flat central platform extending along the elbow support.

14. The arm support of claim 1 where the brace is curved along a horizontal plane extending parallel to a ground.

15. The arm support of claim 14 wherein the brace has a radius of curvature between 3 to 4 inches.

16. The arm support of claim 1 wherein the strap includes a first end attached to the front end of the brace and a second end attached to the rear end of the brace.

17. The arm support of claim 16 wherein the strap includes a length adjuster permitting the brace to be adjusted vertically.

18. A method of supporting an arm of a musician user in a raised position with an elbow of the arm is bent and an upper arm and forearm of the arm raised upward from a relaxed downward position, the method comprising:
   providing an arm support having
      an elbow support for receiving the elbow when the elbow is bent and extending downwardly into the elbow support and the forearm is extending upward;
      a brace sized to abut and be supported against a side of the user's torso;
      a strap providing an upward support of the brace; and
      a pivoting connector communicating between the elbow support and the brace to lock a lateral and vertical position of the elbow support with respect to the brace;
   extending the strap over a shoulder of the user;
   placing the brace against the side of the user's torso; and
   putting the elbow of the arm into the elbow support.

* * * * *